United States Patent Office 3,015,806
Patented Jan. 2, 1962

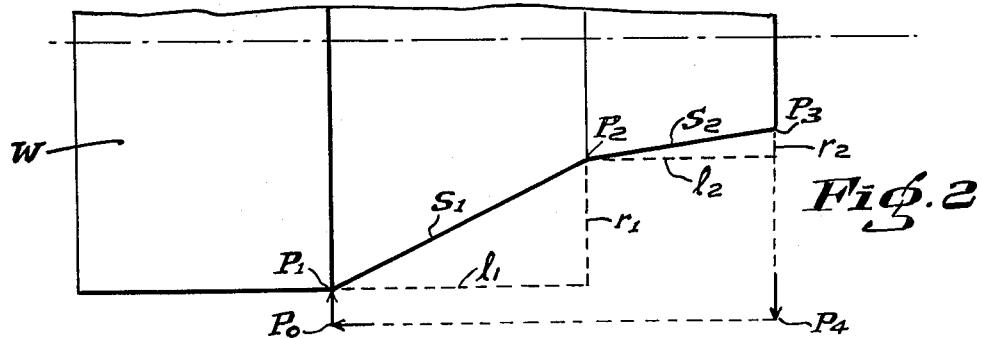
Fig. 2
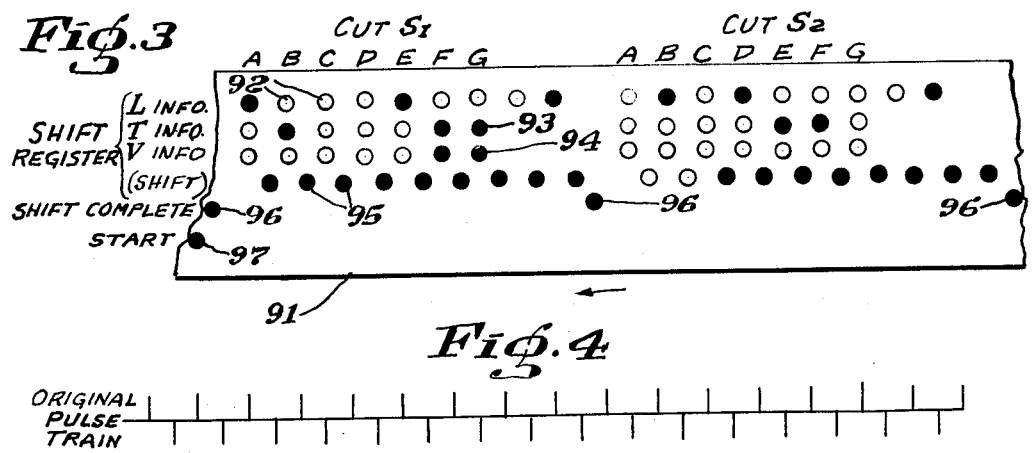
Fig. 3
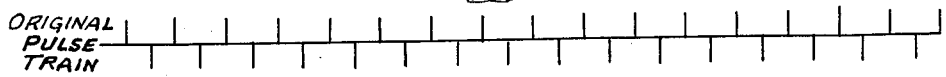
Fig. 4
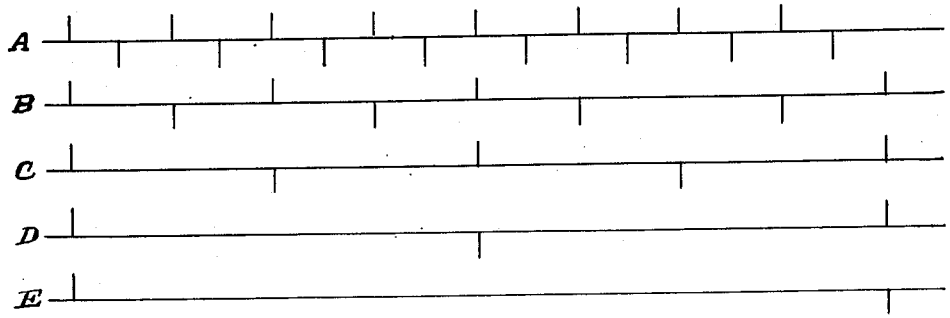

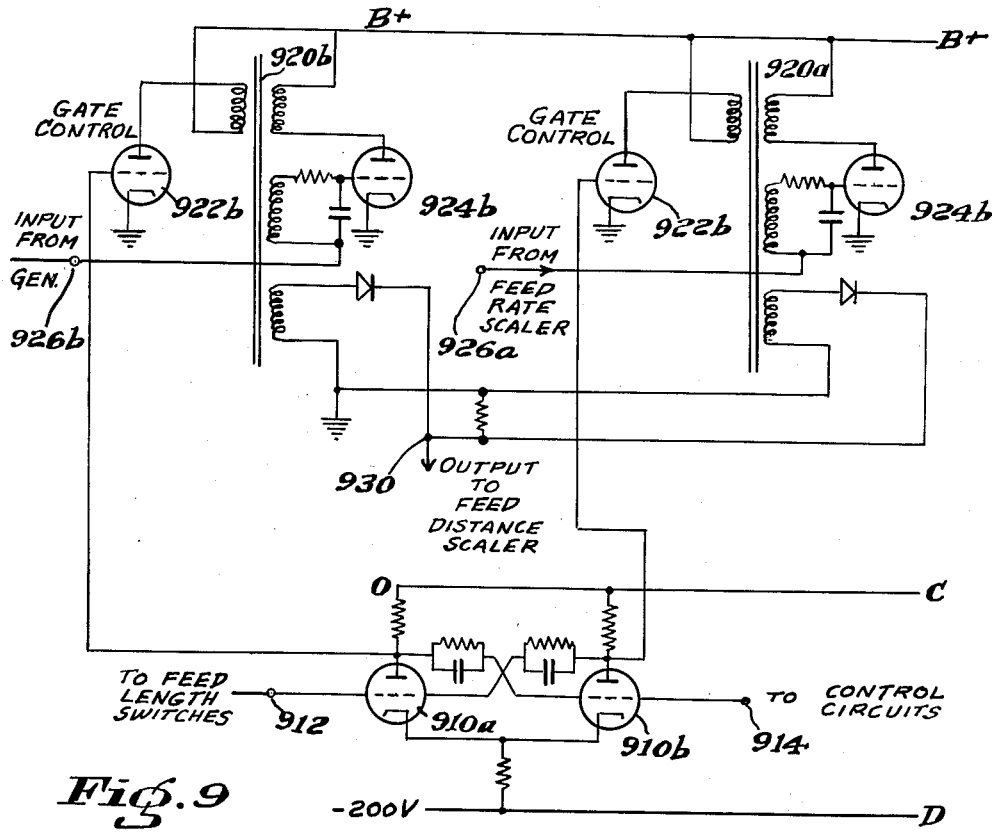
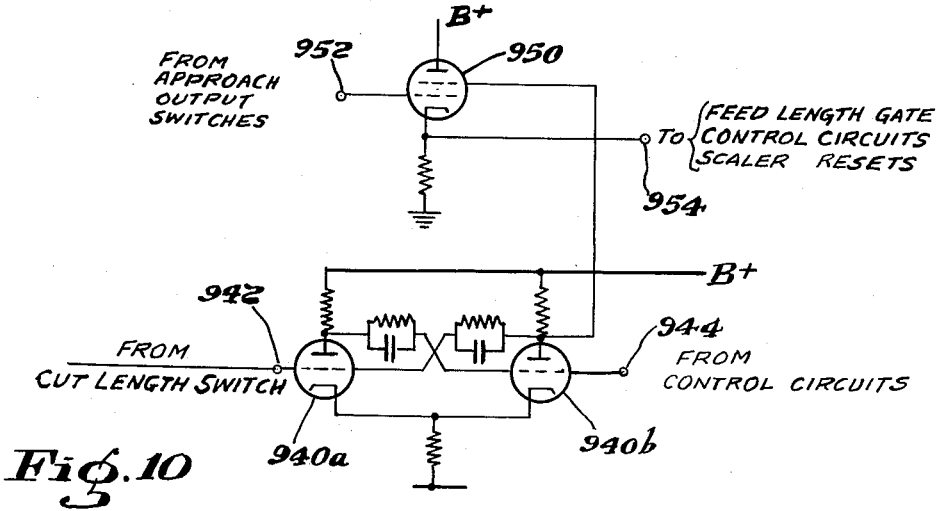

3,015,806
MACHINE TOOL CONTROL SYSTEM
An Wang and Ge Yao Chu, Lincoln, Mass., assignors to Wang Laboratories Inc., Cambridge, Mass., a corporation of Massachusetts
Filed Mar. 12, 1958, Ser. No. 721,056
32 Claims. (Cl. 340—147)

This invention relates to control systems and apparatus particularly including means for interrelating rates and distances to provide predetermined ratios between the feeds of a plurality of machine tool elements, for example, as well as means for maintaining such rates, distances and ratios for predetermined distances and times and for varying such ratios and rates substantially instantaneously so that, for example, elements of a machine tool or the like may be moved substantially simultaneously at periodically varying ratios to produce a contoured cut or other surface and to perform other functions as desired.

Introduction

In automatic machine tools, such as lathes, milling machines, grinders, flame cutters and the like, particularly when cutting contours, it is necessary to move the tool simultaneously by its longitudinal feed, its transverse feed, and possibly by its vertical feed as well. This has heretofore been accomplished in a variety of ways, for example, purely mechanically, as by using suitable linkages to move the tool in response to movement of an element along a cam or other pattern, or, alternatively, either electrically or hydraulically in response to signals from an appropriate control. The latter type of arrangement is desirable for machine flexibility, that is, the ability to produce a variety of products in relatively short runs without an uneconomical amount of down time and labor for the changeover from one product to another. Thus, in order to reduce the down time to a minimum, it has been proposed that the operational commands be fed to a machine tool in the form of magnetic tape, punched tape or cards or the like, so that a tape portion or punched card represents the entire information necessary for the machining of a particular product. This technique has great advantages, as the required tapes or cards can be made up in advance, so that down time is nearly eliminated, except possibly for tool changes.

Such a technique is relatively simple to apply when but one machine element is to be moved at a time to produce, for example, a straight longitudinal or cross cut. However, when two or more machine elements must be moved simultaneously at interrelated speeds and distances to produce a tapered or other contoured cut, the problem becomes much more difficult. Hence, because of the complex control systems heretofore considered necessary to accomplish contouring control, tape or card controlled machine tools have not been much used.

Accordingly, it is a main object of the present invention to provide novel control systems and apparatus for interrelating rates and distances to provide predetermined ratios between the feeds of a plurality of elements so that a tool, for example, may be moved to produce contoured cuts.

It is another main object of the invention to provide means for changing said ratios from one predetermined value to another predetermined value substantially instantaneously.

It is still another object of the invention to provide means for establishing the distance and time during which a predetermined ratio or ratios is maintained.

It is still another object of the invention to provide means for varying the rate of feed of elements within a cycle as may be desired for rapid traverse of a tool or the slow approach of a tool at the end of a cut.

A particular feature of the invention lies in the relatively simple, and hence inexpensive and trouble free, circuitry preferred for use in the invention.

In general, the control systems and apparatus of the invention are capable of wide use wherein relatively simple means are needed for establishing quickly changeable ratios between two or more rates to distances such as, for example, rotational or linear speeds or distances, frequencies of pulses or other waveforms, etc. However, for the purpose of illustrating specific applications of the control systems and apparatus of the invention, its embodiment in a lathe operating system, wherein tool movement may be controlled in three directions by a punched tape will be described and illustrated herein.

The novel features of the invention, together with further objects and features thereof will be more readily understood when considered in connection with the following description of preferred embodiments thereof, together with the accompanying drawings, in which:

FIG. 2 is an enlarged view of a lathe workpiece illustrating a tool movement to produce a cut typical of the system and apparatus of FIG. 1;

FIG. 3 is a diagrammatic view of typical tape punched with operational commands for the cut shown in FIG. 2;

FIG. 4 is a pulse train diagram illustrating the operation of portions of the system and apparatus of FIG. 1;

Figure 1:
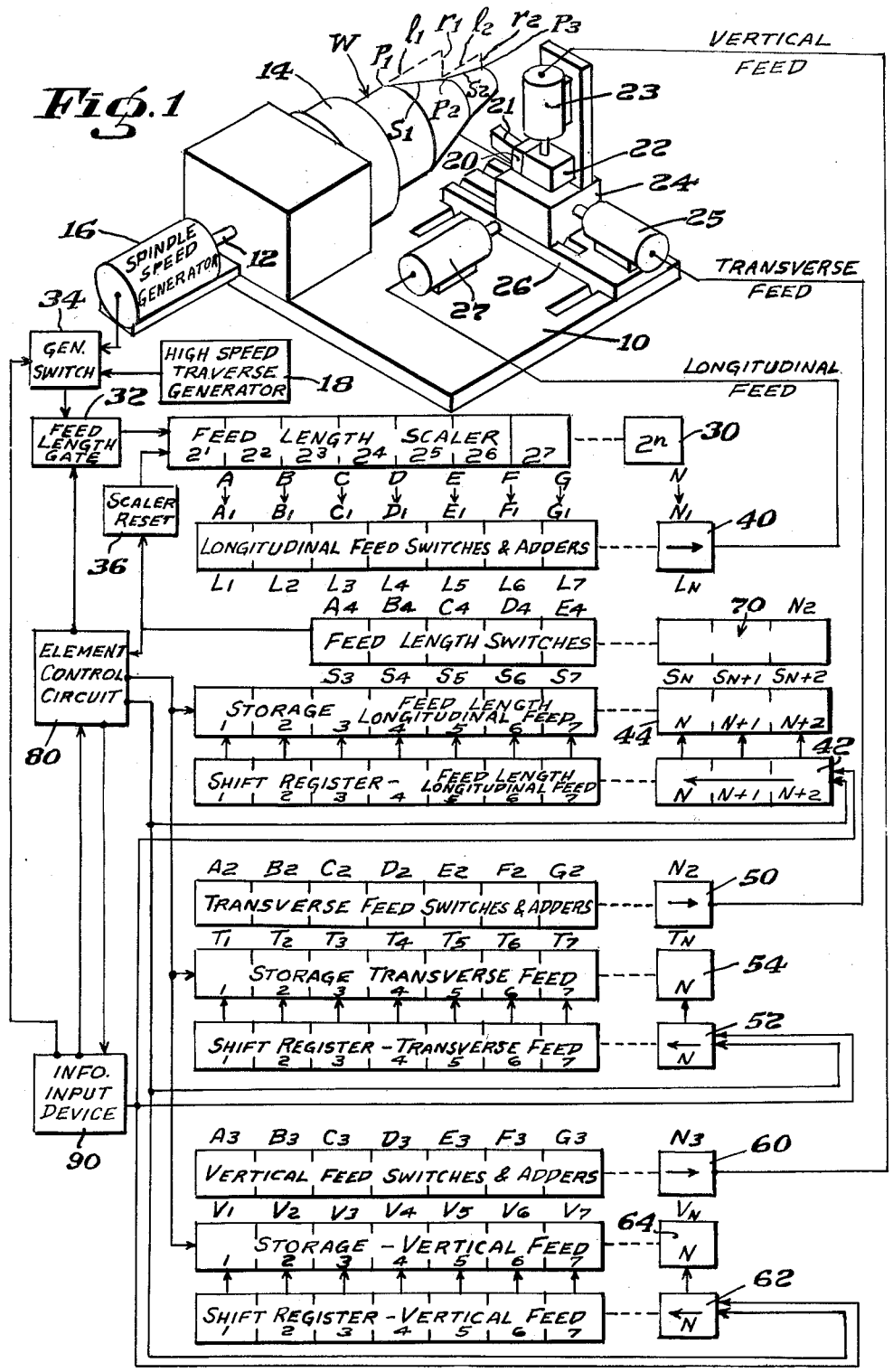
FIG. 1 is a diagrammatic view, mostly in block form, illustrating the application of the control system and apparatus of the invention to a lathe.
Figure 5:
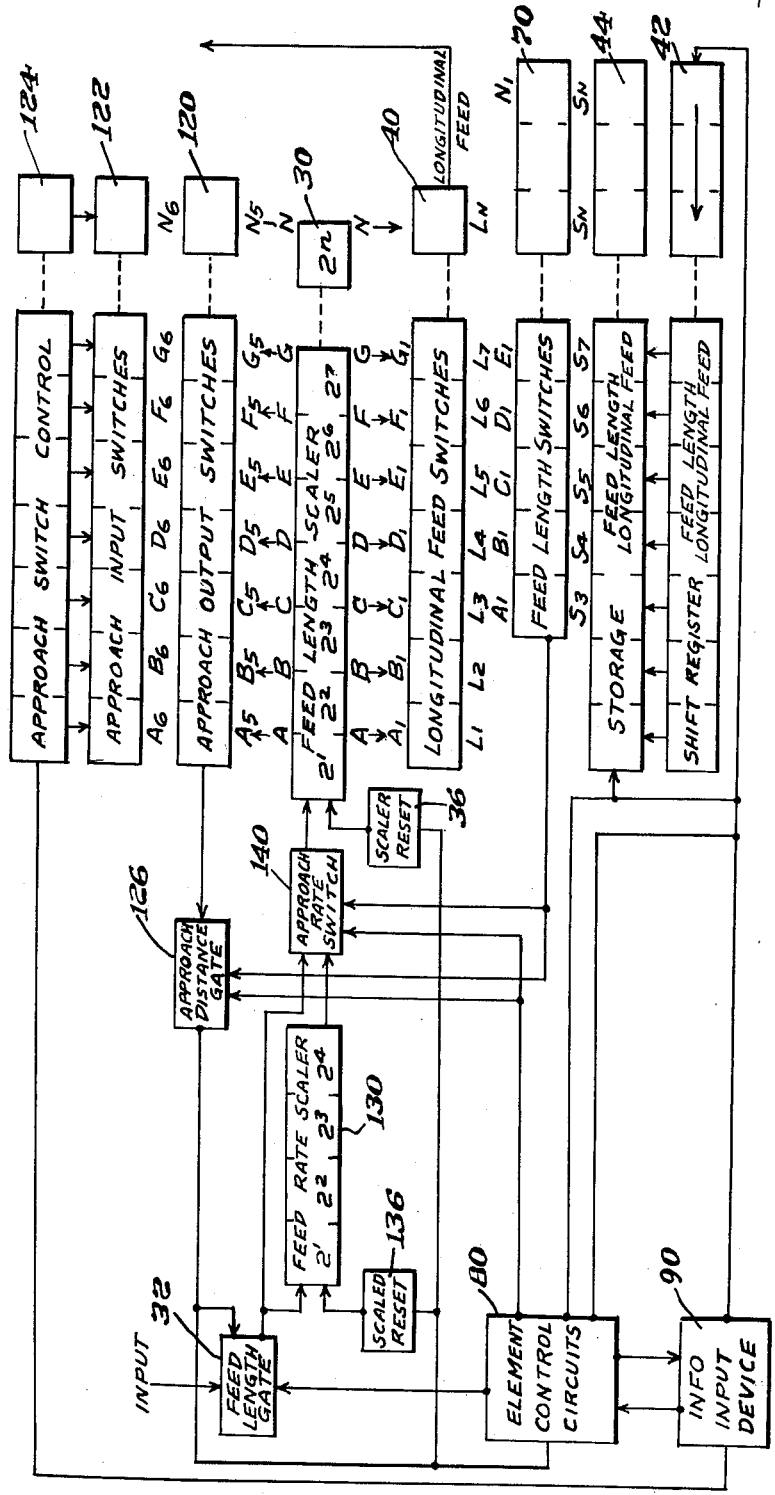
FIG. 5 is a partial diagrammatic view in block form, illustrating a modification of the system and apparatus of FIG. 1.
Figure 6:
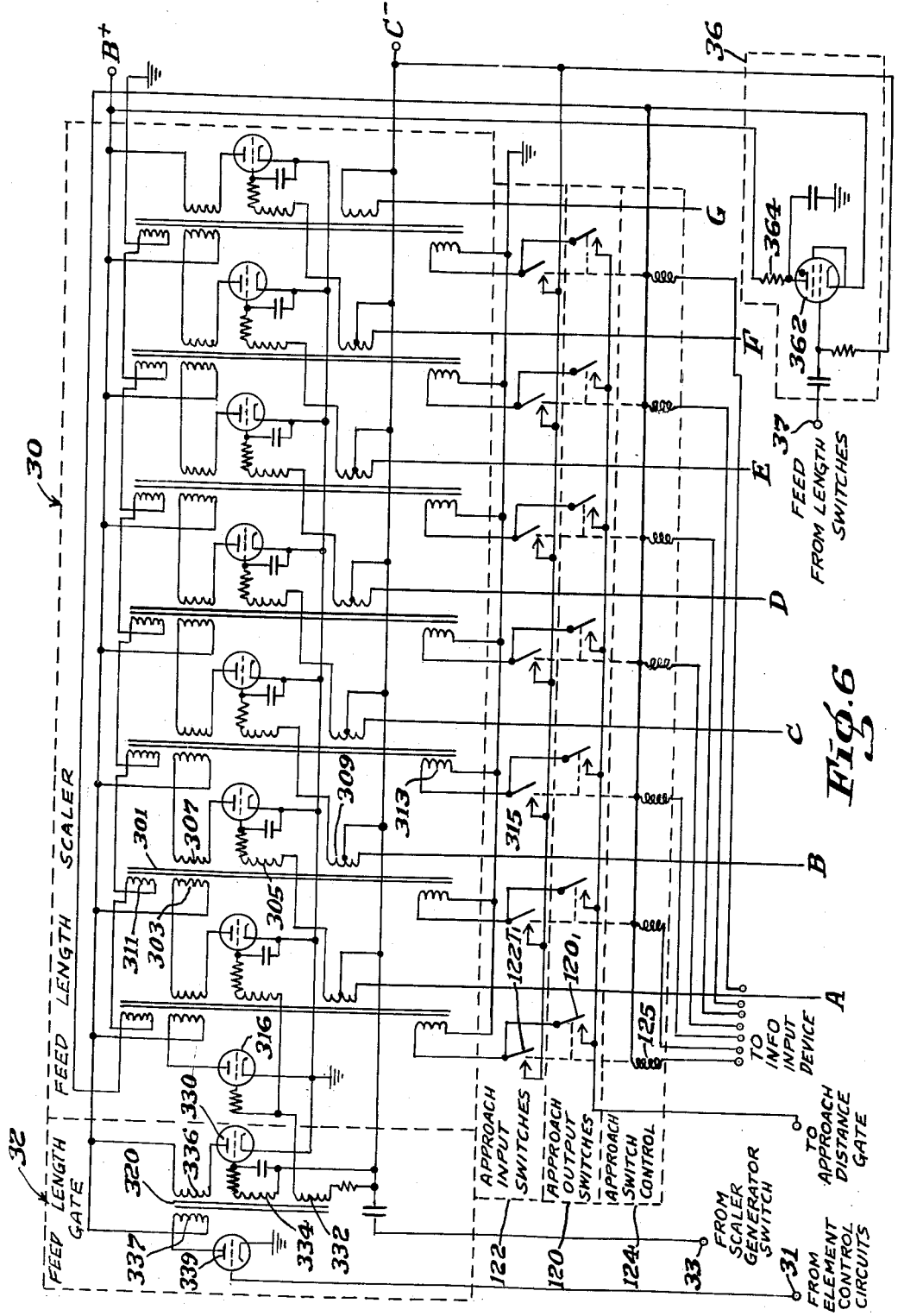
Figure 7:
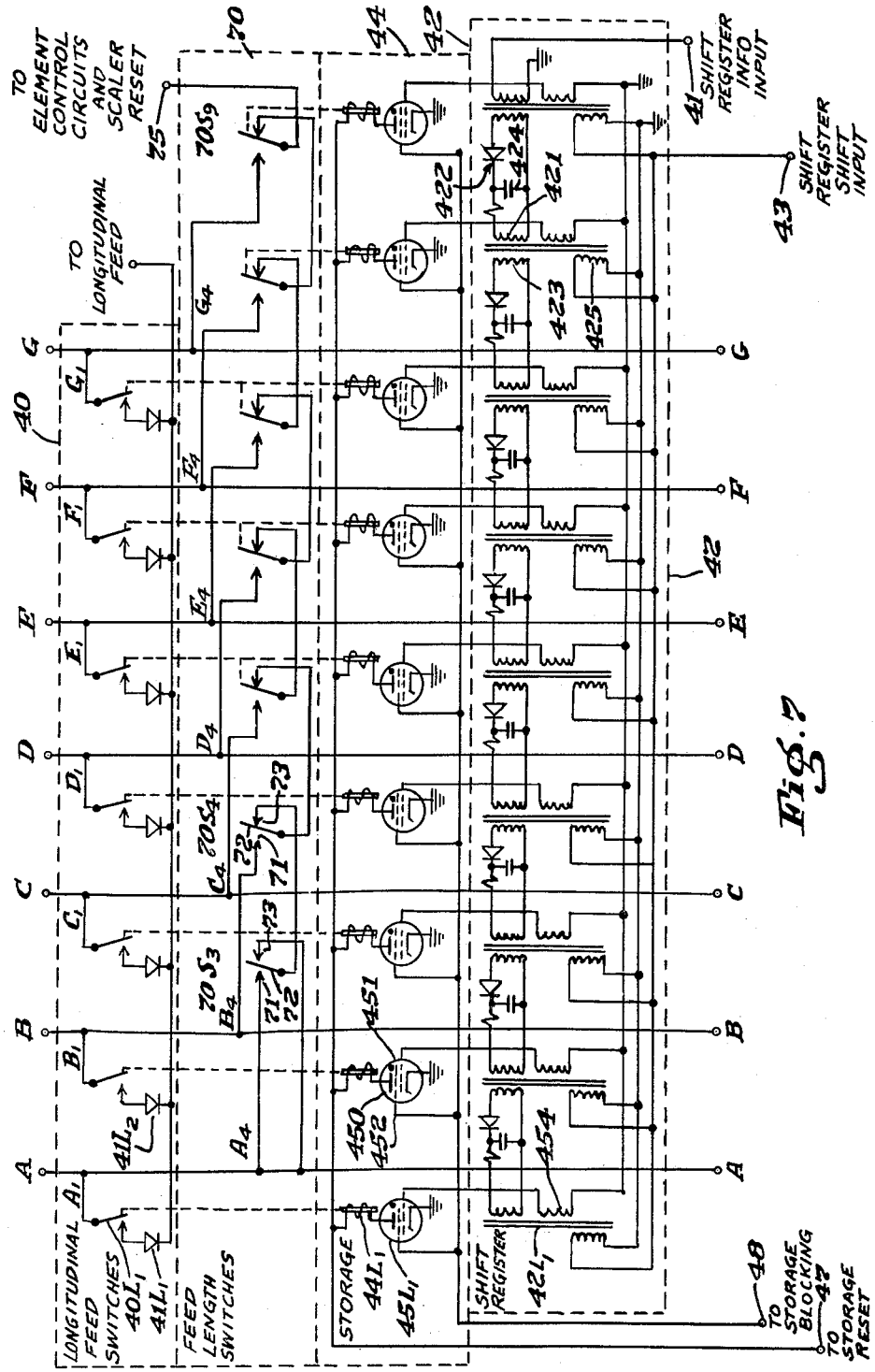
Figure 8:
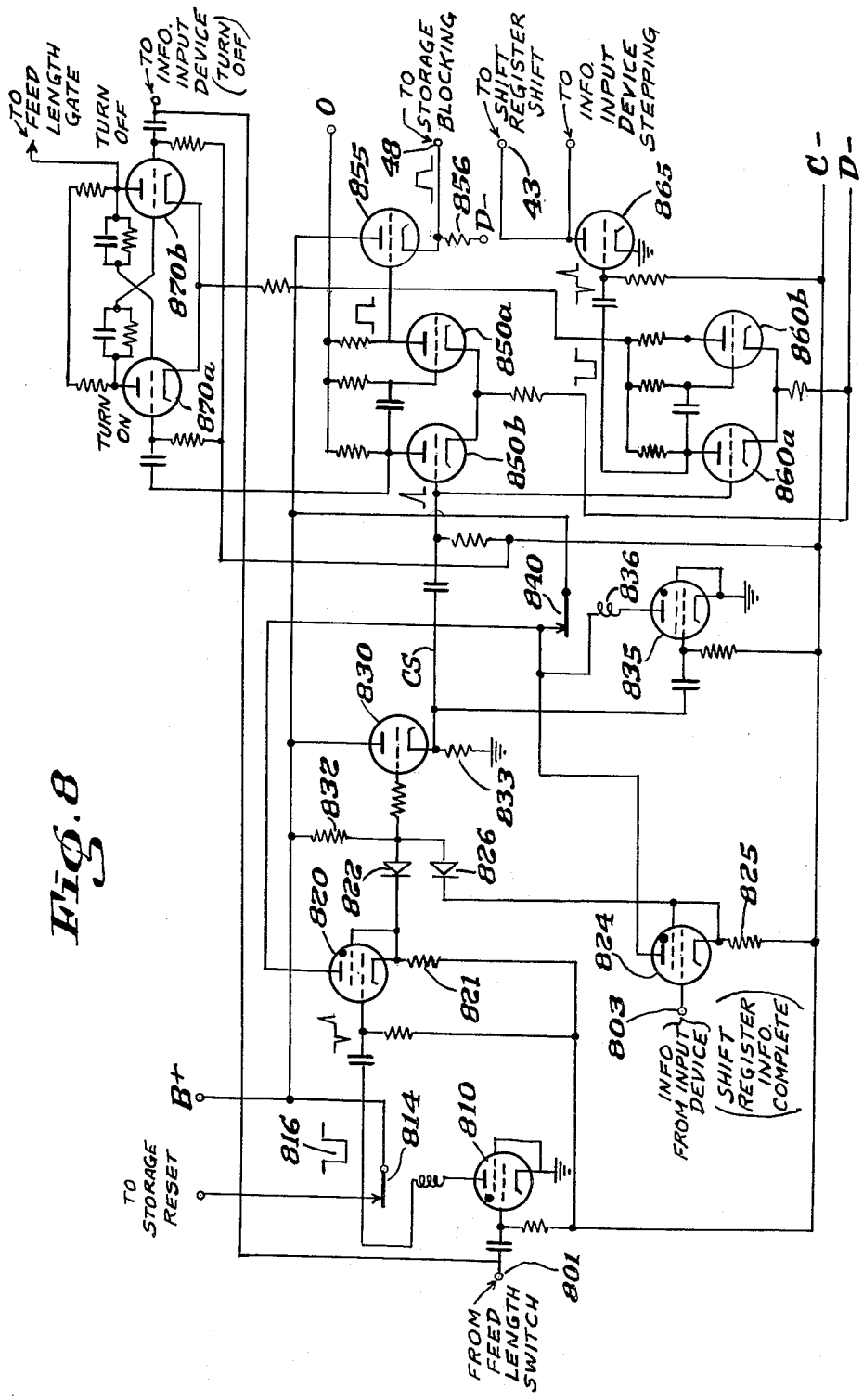

FIGS. 6 through 8 are circuit diagrams of portions of the systems and apparatus of FIGS. 1 and 5; and FIGS. 9 and 10 are circuit diagrams of portions of the modified system and apparatus of FIG. 5.

General description

Referring first to FIG. 1, the machine tool therein diagrammatically shown is a lathe having a base 10 on which is mounted a rotatable spindle 12 directly driving a spindle speed generator 16 and also carrying a suitable chuck 14 for supporting therein a workpiece W. A tool head 20 carrying a tool 21 is also mounted on base 10 progressively in a sliding vertical feed element 22, a sliding transverse feed element 24 and a sliding longitudinal feed element 26, said feed elements being suitably mounted on one another and on base 10 for linear movement along their respective mutually perpendicular axes to move tool head 20 with tool 21 in any direction. Suitable actuators 23, 25 and 27 respectively for moving each of said feed elements in response to impulses applied thereto are provided, such actuators as servo systems, stepping motors and the like being suitable and being generally well known to the art.

Of course, other types of machine tools are generally similar to the above described apparatus. For example, a grinding machine is almost identical, except for the substitution of a grinding wheel for a lathe tool, while a milling machine, for example, has a stationary workpiece with the tool head carrying a rotating milling cutter which may be moved along three mutually perpendicular axes.

In general, the control system of the present invention may be applied to any type of machine tool by means of suitable actuators to provide simultaneous interrelated feed rates and distances in two or more directions, as well as to other mechanisms wherein interrelated rates and distances may be involved. As applied to a lathe or other machine tool, the system of the invention may be considered as an "electronic gearbox" operating in synchronism with the spindle and having a large number of ratios and being capable of instantaneous shifting without stopping the machine so that successive operations may be carried out automatically by the use of coded instructions on a punched tape or the like to produce a workpiece having a succession of cuts to closely simulate a contoured surface (FIG. 2).

According to the present invention, these objects are accomplished from coded commands on a punched tape or the like, such as is shown in FIG. 3 by the utilization of a scaler 30 (FIG. 1), preferably binary, and hereinafter fully described, both as to counting means to establish a predetermined number of input pulses supplied from spindle speed generator 16 or high speed traverse generator 18, and as an input pulse scaling or dividing means comprising a sequential series of scaling elements to produce from said predetermined number of input pulses a plurality of individual pulse trains of successively decreasing frequency, so that each has successively fewer pulses occurring at greater intervals, these being at half value frequencies in a binary scaler (FIG. 4). Particular ones of said trains from such scaler are selectable by suitable output pulse train feed switch and adder means generally designated 40, 50 and 60 and associated with each of the feed actuators, the selected pulse trains being added together to provide a specific predetermined number of pulses at the input terminals of each of the several actuators 23, 25 and 27 to establish a predetermined ratio between the pulses fed to the actuators to operate them, the pulse input to the switch and adder means being common to all of them as it is derived from scaler 30, as a portion only of its outputs. In addition, a series of input pulse controlling feed length switches 70 are provided connected to scaler 30 for establishing the length of the cut in terms of one of the feed distances, said switches 70 being connected to the feed length scaler 30 and its input switch or gate 32 as well as to the information input device 90 such as a punched tape reader and control, both through a scaler reset 32 from feed length switches 70, including their switch elements 71, 72 and 73, and an element control circuit 80.

In order to operate the series of switches and adders 40, 50 and 60, each is provided with a shift register 42, 52 and 62 having suitable associated storage, respectively 44, 54 and 64, which in turn is operated directly and through element control circuit 80 by information input device 90. As hereinafter more fully described, the series of feed length switches 70 are operated by shift register 42 and its storage 44, such having two extra sections for storage of feed length information as can be seen in FIG. 1. Thus the sections of each of the shift registers and their storage means are connected in a manner to control the series of switches 40, 50 and 60, those of shift register 42 being connected to control series of switches 40 and 70, those of shift register 52 being connected to control switches 50, and those of shift register 62 being connected to control switches 60. Binary information stored in a shift register can hence be simultaneously transferred to storage to operate all of the switches of a corresponding series, and the shift register can thereafter have new information advanced into it without thereby changing the associated switches.

The information input device 90 may include a punched tape 91 (FIG. 3) having therein the coded binary information commands for operating the shift registers and carrying out other necessary machine functions, all as hereinafter more fully described. In brief, however, such a tape includes binary information to be fed to the shift registers in the form of holes for operating switches, and is itself operated by a completion signal from the control circuit 80 to advance the tape so as to feed successive sets of information into the shift registers upon completion of the previous set of commands. Such mechanisms are well known in various forms and will not herein be discussed in any detail except as an element of the system of the invention.

Consider, as a simple example to aid in understanding the present invention, before discussing the specific circuitry, that a cylindrical workpiece W is to be cut as shown in FIG. 2 to provide two succeeding conical surfaces, the first cut surface $S_1$ requiring a longitudinal feed distance $l_1$, and a transverse feed distance $r_1$, and the second cut surface $S_2$ requiring a longitudinal feed distance $l_2$ and a transverse feed distance $r_2$. In each case, the longitudinal and transverse feed must be accomplished simultaneously and preferably in synchronism with the spindle rotation within the limits of acceptable machine tolerance in order to provide a conical surface. Suppose, for instance, that the first sloping $S_1$ has a longitudinal distance $l_1$ of 0.0100 inch, expressed as 100 pulses and a transverse distance $r_1$ of 0.0034 inch, expressed as 34 pulses, and the second sloping cut $S_2$ has a longitudinal distance $l_2$ of 0.0056, expressed as 56 pulses, a transverse distance of 0.0006, expressed as 6 pulses, with each pulse thus representing a numerical distance of, say, 0.0001 inch. Any vertical distance component is omitted for simplicity, but its inclusion does not affect the discussion. Generally, such distance is also related to the rotation of lathe spindle 12, being synchronized therewith, for example, although other bases, such as high speed traverse generator 18 can also be used without affecting the ratio between the actuators and their tool feeds. As may be seen from FIG. 1, then, as the spindle 12 rotates, the spindle speed pulse generator 16 operating in synchronism therewith provides a series of regularly occurring pulses to the binary scaler 30 through its feed length gate 32 and pulse generator switch 34. Such pulses are scaled in the usual manner by being divided by a factor of two in each succeeding section of the scaler, and hence a series of pulse trains are produced, one following each section of the scaler at terminals A, B, C, D, E, F, G, ... N (FIG. 3). The scaler 30 is arranged to be shut off after a predetermined number of input pulses by means of an appropriate control hereinafter described. Thus, if for simplicity, we assume a scaler having seven sections, it will count 128 pulses fed it and then be shut off by its gate 32 through feed length switches 70 because of the appearance of a single pulse at the output of its last operative section, here its seventh section. Of these 128 pulses, pulses will be produced following each scaler section as follows:

| Scaler terminal | A | B | C | D | E | F | G |
|---|---|---|---|---|---|---|---|
| Pulse train | 64 | 32 | 16 | 8 | 4 | 2 | 1 |

By selecting certain of these trains, utilizing their non-coinciding negative pulses, and adding them by a suitable series of switch and adder means 40, 50 and 60 for each element to be controlled (FIG. 3), in effect utilizing simultaneously for each of the series of switch and adder means a portion of the total pulse trains available from the outputs of scaler 30, the desired numerical value at any output may be provided so that any desired ratio between the outputs and hence the axes of movement may readily be synthesized and in synchronism with spindle rotation. Thus for a ratio of $$100:34 = l_1 : r_1$$

for $S_1$, the pulse trains at A of 64; at B of 32; and at E of 4 are utilized to provide the value of 100 for the longitudinal (L) feed and the pulse trains at B of 32; and at F of 2 are utilized to provide 34 for the transverse (T) feed.

If desired, a third quantity might be added to the ratio, say the quantity of 3 for the vertical (V) feed, by utilizing the pulse trains at F of 2 and at G of 1. This may all be expressed symbolically as follows:

| Scaler terminal | A | B | C | D | E | F | G | Sum |
|---|---|---|---|---|---|---|---|---|
| Longitudinal feed | 64 | 32 | | | 4 | | | 100 |
| Transverse feed | | 32 | | | | 2 | | 34 |
| Vertical feed | | | | | | 2 | 1 | 3 |

The ratio of 56:6 for $S_2$ is similarly established except, since the largest pulse train needed has a value of 32, the terminal F may be utilized to actuate input gate 32 since its associated scaler section will be the last operative one. Thus, by utilizing such a series of switch means and adders for each feed element, herein shown as longitudinal feed series 40 of switches and adders designated as switches 40–$L_1$, 40–$L_2$, etc., transverse feed series 50 of switches designated as switches 50–$T_1$, 50–$T_2$, etc., and a vertical feed series 60 of switches designated as switches 60–$V_1$, 60–$V_2$, etc., each said series having input terminals, respectively $A_1$, $B_1$, ... $N_1$; $A_2$, $B_2$, ... $N_2$; and $A_3$, $B_3$, ... $N_3$ connected to scaler output terminals A, B, ... N, any number of such feed elements may be simultaneously operated by interrelated quantities of pulses providing predetermined ratios, all of the pulses being derived from a scaler common to all of them and fed with a predetermined number of pulses.

At the same time, the appearance of a single pulse at the last operative scaler section, at terminal G for cut $S_1$, and F for cut $S_2$ is utilized through the feed length switches designated 70–$S_1$, 70–$S_2$, ... 70–$S_N$ connected to scaler terminals A, B, ... N to operate input gate 32 and turn off the pulse input to feed length scaler 30 to establish the predetermined number of input pulses, here 128 for $S_1$ and 64 for $S_2$. This occurs since any distance S is geometrically related to each of its feed distances, designated as $l$ and $r$ can be utilized to control the cut length S. Thus, assuming that scaler 30 is to be utilized as efficiently and rapidly as possible by the use of only those stages necessary to accommodate the largest pulse train to be utilized for synthesizing the desired values, such largest needed pulse train will appear at A following the first stage of the shift register and the single pulse counted down from such largest pulse train will be utilized to control pulse input switch or gate 32 and turn off the input pulses applied to scaler 30. Thus, referring to the above symbolically expressed example, since the largest pulse train needed to synthesize the desired ratio with the required accuracy have a numerical value of 64 for $S_1$, th single pulse from scaler terminal G is hence the last operative section and is used to operate gate 32 while with $S_2$ terminal F is used. If a pulse train of still smaller numerical value were to be used, say a value of 2, the pulse from scaler terminal B could be used as the pulse from the last operative section, while with larger numerical values more scaler stages would be necessary up to the maximum provided, such maximum being eighteen in a specific lathe control system constructed and operated according to the invention.

The shift registers, as hereinafter set forth in some detail, incorporate storage means for each section thereof to permit uninterrupted operation of the series of switches 40, 50 and 60 during the time necessary for advancing the new information in the shift registers from information input device 90. This is necessary to enable an instantaneous change of feed ratios so that the lathe may be operated continuously as is especially important during the cutting of complicated contours made up of a series of short slope cuts. This situation is shown in its simplest form in FIG. 1 wherein, assuming movement of tool 21 from left to right in a direction away from chuck 14, a first cut $l_1 r_1$ is followed by a second cut $l_2 r_2$.

As to the operation of the shift registers in the system, assuming that "1" information in storage maintains a switch closed and that "0" information maintains it open, the above recited switch feed values of 100, 34 and 3 with their corresponding shift register storage may be expressed as follows:

| Scaler terminal | A | B | C | D | E | F | G | Sum |
|---|---|---|---|---|---|---|---|---|
| Longitudinal feed | 64 | 32 | | | 4 | | | 100 |
| Shift register | 1 | 1 | 0 | 0 | 1 | 0 | 0 | |
| Transverse feed | | 32 | | | | 2 | 1 | 34 |
| Shift register | 0 | 1 | 0 | 0 | 0 | 1 | 1 | |
| Vertical feed | | | | | | 2 | 1 | 3 |
| Shift register | 0 | 0 | 0 | 0 | 0 | 1 | 1 | |

In addition, in order to operate the input pulse controlling feed length switch series 70 together with output pulse train longitudinal feed switch series 40 by shift register 42 and storage and so avoid the use of an additional shift register, shift register 42 and storage 44 are provided with two additional stages, designated in FIG. 1 as 42–N+1 and N+2 and 44–N+1 and N+2, for the accommodation of a two-element control signal which can be utilized to operate its associated feed length control gate. It should be noted especially, that because of the utilization of a two-element control signal positioned in shift register 42 and storage 44 following the coded feed information stored therein, the feed length switches are positioned on FIG. 1 appropriately above the shift register 42 and storage 44 for actuation by a shift register stage but are positioned two elements to the right insofar as the connection to scaler terminals A, B, ... N are concerned. This will be apparent from the following symbolic showing, wherein the longitudinal feed shift register has two additional stages carrying the coded feed switch length information.

| Scaler terminal | A | B | C | D | E | F | G | | |
|---|---|---|---|---|---|---|---|---|---|
| Longitudinal feed | 64 | 32 | | | 4 | | | | |
| Shift register | 1 | 1 | 0 | 0 | 1 | 0 | 0 | 0 | 1 |

The related showing for cut $S_2$ is as follows:

| Scaler terminal | A | B | C | D | E | F | G | | | Sum |
|---|---|---|---|---|---|---|---|---|---|---|
| Longitudinal feed | 32 | 16 | 8 | | | | | | | 56 |
| Shift register | 1 | 1 | 1 | 0 | 0 | 0 | 0 | 0 | 1 | |
| Transverse feed | | | | 4 | 2 | | | | | 6 |
| Shift register | 0 | 0 | 0 | 1 | 1 | 0 | 0 | | | |

From the above, since it is the appearance of a single pulse at the last operative scaler section, herein at terminal G, which is to be utilized to operate input pulse feed length gate 32 to so establish the predetermined number of pulses to be fed into the scaler 30, the input pulse controlling feed length switch 70 operated by the "1" information appearing in the last stage is connected to said terminal G.

Returning to a consideration of the input of controlling information to the shift registers and other circuit elements, such is provided automatically from tape reader and control 90 and stepped in synchronism through all of the shift registers in a direction from right to left as shown in FIG. 1. A punched tape 91 containing such information is shown in FIG. 3, with the white circles representing "0" information to be fed into a shift register and the black circles representing "1" information in the form of actual holes through the tape. The information is simultaneously fed into all of the shift registers by applying shift pulses in the usual manner. Upon the arrival of the first "1" information at the left end of any one of the shift registers as determined by the coded instructions—this being accomplished by providing additional shift pulses in the case of information less than the maximum provided for as can be seen in FIG. 2—shifting of all of the shift registers is terminated as is also the tape advance. Hence, the largest pulse train to be utilized is always present at scaler terminal A, and the presence of the feed length controlling information follows the position corresponding to the single pulse counted down from such pulse train.

Before considering in detail the circuitry preferably utilized in the control system of the invention, a typical cycle of operation of the entire system of the invention as shown in FIG. 1 will be discussed. Suppose that the workpiece W as shown in FIG. 2 is to have a first sloping cut $S_1$, followed by a second sloping cut $S_2$, requiring the use of longitudinal and transverse feeds. Assuming that the tool is positioned at $P_1$ at the left-hand end of the cut as shown in FIG. 1, it having been advanced thereto in a transverse direction from $P_0$ by the high speed traverse generator 18 upon an appropriate signal from the information input device 90 and that suitable information is stored in the two shift registers involved, longitudinal feed shift register 42 and transverse feed shift register 52. Upon arrival of tool 21 at point $P_1$, the information input device will shift switch 32 to connect spindle speed generator 16 to input gate 32 and simultaneously transfer the information already contained in the shift registers to the storage for operation of the switch series. The spindle speed generator 16 produces input pulses which are fed through open feed length gate 32 to scaler 30. The resulting pulse trains will, through actuators 25 and 27 advance the tool 21 substantially simultaneously in its longitudinal and transverse directions at the predetermined ratio and this will also occur in synchronism with the spindle speed so that the feed rates of tool 21, as well as being synchronized with one another, are related to spindle speed as is desirable in this art.

While the $l_1r_1$ cut $S_1$ is proceeding in accordance with the information in the storage portions 44 and 54 of the shift registers, the information for the $l_2r_2$ cut $S_2$ is stored in the shift registers 42 and 52 so that it will be available for transfer to the storage upon completion of the cut $S_1$.

Thereafter, upon the completion of the cut $S_1$, as determined by the feed length switches 70, the shift registers 42, 52 and 62 together with their storage 44, 54 and 64 will be simultaneously operated to advance the information already stored to instantaneously begin the cut $S_2$, the cut length switch simultaneously being reset by a signal from the information input device 90 through element control circuit 80 to begin the feed of a new series of input pulses. Thereafter, upon the completion of cut $S_2$, cut length switch will turn off the input pulses and stop any further advance of the tool 21 along the work, except for movement of the tool away from the work to position $P_4$ and thence to position $P_0$ as a result of further controlling signals from the information input device 90.

Turning now to the modified system shown in FIG. 4, such system adds to the system of FIG. 1 a slow approach feature wherein the tool feed rates are automatically decreased just prior to the end of a cut. This prevents overshoot due to the mass of the machine tool components and so makes less critical the requirements of the servo systems commonly employed for moving the machine tool elements. In general, the modification includes a series 120 of approach distance input pulse controlling switches designated 120–$A_5$, 120–$B_5$ . . . 120–$N_5$, and related output switches designated 122–$A_6$, 122–$B_6$ . . . 122–$N_6$, a control 124 for said switches and an approach distance gate 126 for controlling the output of pulses from the output switches. A feed rate scaler 130 having an appropriate reset 132 and an approach rate switch 140 is also provided for changing the input pulse rate from its normal value to a related lower value determined by the number of stages in frequency dividing feed rate scaler 130, say four in number as shown to give a ratio of 1:16.

In brief, the modified system is operated by utilizing a marker pulse inserted by approach input switches 122 into feed length scaler 30 at a scaler stage in advance of the last scaler stage in use, the count down between such advance stage and the last stage representing the number of pulses prior to the end of the cut at which the change to slow approach rate is desired. When such marker pulse reaches the last stage of scaler 30 in use, it actuates the associated one of cut length switches 70 which in turn operates electronic approach rate switch 140 to derive a slow rate pulse input from feed rate scaler 130. Switch 70 also opens approach distance gate which had been kept closed to prevent transfer of pulses through an approach output switch to operate gate 32. When the predetermined number of pulses have been fed to feed length scaler 30, as indicated by the appearance of the first input pulse following the opening of gate 126 to said scaler 30 at the operative approach output switch thereof, the main gate 32 is shut off as before. The commands for setting the approach input and output switches by means of their common control 124 may be fed directly to said control by information input device 90, since but a single one of each of said switches is utilized at a time, or alternatively, extra shift register sections may be utilized for setting similarly to the arrangement for the feed length switches 70.

*Specific circuitry*

Turning now to the specific circuitry preferred for the system of the invention, in FIG. 6 is shown binary feed distance scaler 30, together with its associated feed length gate 32 and reset 36. Such scaler is of the magnetic core type as is described in U.S. Patent No. 2,772,357, and includes a number of identical stages, herein seven in number, having output terminals A through G. Each of said stages includes a magnetic core 301 having two input windings, current input winding 303 and voltage input winding 305, a current feedback winding 307 connected to the current input winding of the succeeding core, and a voltage output winding 309 connected both to the voltage input winding of the succeeding core and to one of said terminals A through G. Voltage input winding 305 is connected to the grid and current feedback winding 307 to the plate of a triode vacuum tube 310. Two additional windings are also provided on each of the cores, a reset winding 311 connected to reset circuit 36 and approach distance windings 313 connected by their associated switches to the approach distance gate 122. Said windings 313 and their switches are used only in connection with the slow approach modification of the invention and will be taken up hereinafter. The scaler itself is so well known in the art as to not require further explanation except as to its operation in the system of the invention as hereinafter set forth.

The feed length gate 32 also includes a core 320 having windings thereon and a triode 330 operated thereby to energize the input triode 316 of the scaler connected to the first of its current input windings 303. Thus two voltage input windings are provided on core 320, a first one 332 being connected to the grid of input triode 316 and the second one 334 to the first voltage input winding 305, each of such windings being connected to terminal 33 of feed length gate 32. Triode 330 has its plate connected to current feedback winding 336. A control winding 337 is also provided on core 320, such winding being connected to the plate of a triode 339 which has its grid connected to terminal 31 of feed length gate 32.

In operation, the grid of triode 339 is normally maintained at a voltage level to keep said triode cut off, thus preventing periodic resetting of core 337 as is necessary for it to permit the passage of input pulses through winding 332. Thus pulses from the scaler generator switch applied at terminal 33 cannot pass through the gate 32 to the input of scaler 30. However, applying a higher voltage level at gate terminal 31 so that control triode 339 becomes conducting permits the periodic resetting of core 320 and the passage of pulses from terminal 33 to the input of the scaler. It might also be noted that an alternating voltage input, as usually occurs from a shaft driven generator such as generator 16, produces a true pulse input to scaler 30 because of the operation of input triode 316 as alternately cut off and conducting to generate a pulse output in its plate circuit corresponding in frequency, that is pulse rate, to the input alternations.

The scaler reset 36 includes a thyratron 362 having a high value of plate resistor 364, the grid of such thyratron being connected to scaler reset input terminal 37 and the plate resistor of such thyratron being connected to each of reset windings 311. When such circuit is operated by applying a positive pulse to its terminal 37 by means of feed length switches 70, the thyratron conducts momentarily to apply a resetting pulse to all of cores 301 to reset each of them to a common state of residual magnetic flux density.

In FIG. 7 is shown a detailed circuit of the longitudinal series of feed switches and adders 40, together with their associated shift register 42 and storage 44 as well as the series of feed length switches 70 also operated by said shift register and storage. As explained above, two extra sections are needed in the shift register and storage utilized with the feed length switches 70 as compared with those associated with the transverse and vertical feed switch series 50 and 60, and these extra sections appear in FIG. 7 at the right-hand edge thereof. Otherwise, the shift registers 52 and 62 with their associated storage 54 and 64, as well as switch series 50 and 60 are identical with the circuit arrangement of FIG. 7.

Thus, each of the series of feed switches and adders, illustrated in terms of the longitudinal series in FIG. 7, includes a solenoid operated switch arm $40-L_1$, $40-L_2$ . . . $40-L_7$ having its one terminal $A_1$, $B_1$, . . . $G_1$, connected respectively to a terminal A . . . G of feed length scaler 30 and its other terminal connected to its associated diode $41-L_1$, $41-L_2$ . . . $41-L_7$, the opposite side of all of said diodes being connected together and to longitudinal feed actuator 27 as adding means. A solenoid coil designated as $44-L_1$, $44-L_2$, . . . $44-L_7$ is provided for operating each of said switch arms to close its associated switch arm when said coil is energized, each of said coils being arranged in the plate circuit of a thyratron 45 which operates as a storage means for information transferred from the shift register. The thyratrons, designated as $45-L_1$, $45-L_2$, . . . $45-L_7$ have all of their plates 450 connected through their associated coils $44-L_1$, $44-L_2$, . . . $44-L_7$ to storage reset terminal 47, all of their first control grids 451 to transfer windings 454 and all of their second control grids connected to storage blocking terminal 48. The cathodes 453 of all of the thyratrons are connected to ground.

The shift register 42 for receiving information in the form of "1" or "0" to operate thyratrons $44-L_1$ . . . $44-L_7$ is entirely conventional, being shown, for example in U.S. Patent No. 2,652,501, and includes a plurality of magnetic storage elements or cores, one for each section of the register and designated as $42-L_1$, $42-L_2$ . . . $42-L_9$. Said cores have information input windings 421 and output windings 423, with the output winding of one core 42–L connected to the input winding of a succeeding core through a series diode 422 and shunt capacitor 424 for movement of either "0" or "1" information in a direction from right to left in FIGS. 7 and 1, said information being fed to said shift register at terminal 41 thereof. For advancing the information along the shift register, a shift winding 425 is provided on cores 42–L, all of said shift windings being energized alternately with the information supplied to terminal 41 by shift pulses applied to terminal 43, the information and shift pulses being provided by coded commands on the tape 91 of the information input device 90. Like the binary scaler 30, the shift registers and their operation are so well known as not to require explanation except as to their interconnections in the system of the invention. Such interconnection, in addition to the inputs at terminals 41 and 43 consists of the transfer windings 454 on each of the cores connected to the first grids 451 of thyratrons 45–L. These transfer windings are energized by a shift of information from their associated core 42–L, so that, in order to transfer such information to a thyratron 45–L to energize its plate coil 44 and close switch arm 40–L, it is simply necessary to apply a shift pulse at terminal 43. Assuming the thyratrons to be non-conducting but with a positive voltage applied to their plates at terminal 47, a positive pulse applied at a first grid 451 will result in that thyratron becoming conductive so long as the second grid 452 does not have a negative voltage applied thereto. Thus during transfer, the voltage of the second grid 452 is raised from its normal negative value which normally prevents transfer of information as when advancing information into the shift register from information input device 90.

The input pulse controlling feed length switches, designated $70-S_3$, $70-S_4$, . . . $70-S_9$ each consists of single pole double throw switch having its arm 72 operated by one of the associated solenoids $44-L_3$, $44-L_4$, . . . $44-L_9$ so that said arms are connected to their left-hand terminals 71 (FIG. 7) when energized and to their right-hand terminals 73 when de-energized. The left hand terminals 71 of a switch is in each case connected to the scaler output two sections removed to the left, that is, terminal 71 of switch $70-S_3$ is connected at $A_4$ to scaler terminal A, of $70-S_4$ at $B_4$ to terminal B . . . of $70-S_9$ at $G_4$ to terminal G. The arm 72 of each switch is connected to the right-hand terminal 73 of the next succeeding switch, with such right-hand terminal of the last switch $70-S_9$ being brought out at terminal 75 for control of the element control circuits 80 and the scaler reset 36. If desired, the right-hand terminal 73 of switch $70-S_3$ may be connected to scaler terminal A as shown or to the grid of scaler input triode 316. With the feed length switches so interconnected, the one of said switches furthest to the right connected to its terminal 71, that is, the one energized by the "1" feed length controlling pulse will control the series of switches 70 and connect the last stage in use of scaler 30 to output terminal 75.

A control circuit 80 which may be used with the preferred circuitry of the invention is shown in FIG. 8. Such circuit, in brief, has two inputs, one at terminal 801 from the feed length switches 70 and the other at 803 from the information input device 90, together with an "and" circuit producing an output signal $CS_1$ only upon the occurrence of both input signals. This feature makes certain that a cut is completed and that information is present in the shift registers for a new cut before the new cut can be started by transferring the information to storage and opening the feed length gate 32.

The input from the feed length switches 70 at terminal 801 is to the grid of a thyratron 810 having a switch actuating coil 812 in its plate circuit, such coil being connected through the normally closed switch arm 814 to a suitable source of plate voltage. Thus, when thyratron 810 is caused to conduct by a pulse applied to its grid, switch arm 814 is momentarily opened to produce a zero voltage pulse 816 and shut off the thyratron 810. The storage thyratrons 45–L are also supplied with plate voltage by switch arm 814 so that they are simultaneously reset with thyratron 810.

The pulse 816 is differentiated by a suitable RC circuit and applied to the grid of a storage thyratron 820 having its plate connected through the normally closed switch arm 840 to a suitable source of plate voltage, and an output diode 822 forming one element of the "and" circuit is connected to the junction of the cathode resistor 821 with said thyratron. The input from the information input device at terminal 803 is passed directly to the grid of storage thyratron 824, such thyratron also having its plate connected to switch arm 840, with an output diode 826 forming the other element of the "and" circuit connected to the junction of the cathode resistor 825 with said thyratron. The combined output of diodes 822 and 826 are connected to the grid of triode 830 as well as to a source of positive voltage through a resistor 832, the values of resistor 832 being chosen so that triode 830 is cut off unless current is flowing in both storage thyratrons 820 and 824 indicating that inputs have been applied both to terminal 801 and terminal 803. Upon triode 830 becoming conductive, storage thyratrons 820 and 824 are reset by their reset thyratron 835 having its grid connected to the junction of said tride and its cathode resistor 832, the plate of said triode having a coil 836 for operating switch arm 840 so that energization of said thyratron momentarily opens arm 840.

The control signal $CS_1$ produced at the junction of triode 830 and its cathode resistor is utilized to transfer the information in the shift registers into their storage to open the feed length gate previously closed by a pulse from the feed length switches and to energize the information input device to feed new information therefrom into the shift register. The first of these functions is accomplished by two pairs of flip-flops fed in parallel with pulse $CS_1$ to provide suitable output pulses. Thus, a conventional twin triode circuit 850 is pulsed to cause triode 850a to become conducting momentarily, the grid of output triode 855 being connected to the plate of such triode 850a so that it becomes momentarily conducting to provide a positive output pulse at the junction of cathode resistor 856, such pulse being applied to the second grids 452 of storage thyratrons 45-L at terminal 48 to ready them for transfer of information from the shift register. At the same time, another conventional twin triode circuit 860 is pulsed to cause its triode 860a to become momentarily non-conducting to produce a negative pulse, which, after differentiation by a suitable RC circuit is fed to the grid of triode 865 to produce a pulse which is fed to the shift windings 425 at terminal 43, the time consideration being such that the occurrence of the output pulse from triode 865 is during the occurrence of the storage unblocking pulse from triode 855.

The feed length gate opening is provided by utilizing a pulse from triode 850b which is differentiated and fed to a grid of triode 870a of a pair of twin triodes 870a and 870b forming still another flip-flop. Thus the differentiated positive portion of the pulse, which occurs after the storage unblocking and transfer pulses, energizes the grid of triode 870a to cause it to become and remain conductive and so provide a positive voltage level at terminal 31 of feed length gate to cause the gate to remain open until the application of a pulse to the grid of triode 870b from the feed length gate at terminal 801 causes that triode to become conductive and so turn off said gate.

The pulse from triode 865 may also be used to energize the information input device 90 to begin its cycle to advance new information into the shift registers, a suitable short time delay being interposed so that such does not occur until after the completion of transfer, that is, after the storage unblocking pulse at terminal 48 terminates.

The information input device 90 used with the perforated tape 91 shown in FIG. 3 is well known to the art and may be considered as an electro-mechanical system including a plurality of switches cooperating with the perforations in the tape to produce output pulses for control or signifying "1" information, "0" information being the equivalent of no pulse in a series of pulses such as is fed to a shift register. The device 90 is further of a type which, once started either manually or by an input signal from triode 865, will automatically shift the perforated tape through the length of a series of coded information such as is simultaneously fed to each of the shift registers and then stop, to be restarted again only by an actuating signal, as from triode 865, to advance through the next succeeding series of coded information. The coded information on the tape, as shown in FIG. 3, in general includes a series of perforations 92, 93 and 94 containing "1" and "0" information for each of the three shift registers, a series of perforations 95 for simultaneously shifting all of said registers between each of the information input signals, and a perforation 96 for each of the tape sections for application to terminal 803 to signal the completion of feed of one of the series of shift register information and readiness to begin another said series.

The operation of the system of FIG. 1, utilizing the circuitry of FIGS. 6 to 8 is generally explained above as a part of the general discussion of the system of FIG. 1, as well as in regard to the specific circuitry involved. However, to summarize the operation in terms of the tool cycle shown in FIG. 2, consider that the tool is positioned at $P_0$ and that the system is entirely cleared of information with the gate 32 closed but with the lathe running so that spindle speed generator 16 as well as high speed traverse generator 18 is producing an output signal. From an inspection of FIG. 2, it is apparent that five series of commands must be supplied on the perforated tape, a command for the high speed transverse movement from $P_0$ to $P_1$; for the cut $S_1$, for the cut $S_2$; for the high speed transverse movement from $P_3$ to $P_4$; and for the high speed transverse movement from $P_4$ to $P_0$. The first of these commands requires actuation of generator switch 34 to connect the high speed traverse generator 18 to gate 32, and the input of information into transverse shift register 52. This is accomplished by starting the information input device so that the required information is fed into shift register 52 so that the tool will be advanced by the specific number of pulses representing the distance $P_0$–$P_1$. After this has been accomplished, a signal from a suitable tape perforation 96 is applied to terminal 803 (FIG. 8) and a signal from still another tape perforation 97 is applied to terminal 801 (FIG. 8). The "and" circuit of control circuit 80 (FIG. 8) then operates as explained above to transfer the information from the shift register 52 to the transverse feed storage 54, thus closing selected switches of series 50 to open feed length gate 32 so that the infeed of pulses to the feed distance scaler will begin, and to restart the tape so that the next succeeding set of commands will be fed into the shift registers. Meanwhile, the selected pulse trains from scaler 30 are added and fed to transverse feed actuator 25 to advance the tool to $P_1$. Upon the tool reaching $P_1$, as is determined by the appearance of the first pulse from the feed length switches 70, the feed length gate is immediately turned off, and storage thyratron 820 (FIG. 8) turned on. If the information for the first cut $S_1$ as explained above has by this time been stored in shift registers 42 and 52, thyratron 827 (FIG. 8) will also be turned on, so that the "and" circuit will operate to transfer the information into storage 44 and 54, for setting selected switches 40 and 50, to turn on gate 32 again and to again advance the tape for feeding information for cut $S_2$ into the shift registers 40 and 50. The process is repeated upon the tool's reaching $P_2$, providing an instantaneous change from cut $S_1$ to cut $S_2$, and again at points $P_3$ and $P_4$, with the high speed traverse being used for the tool travel from $P_3$ to $P_4$ and $P_4$ to $P_0$. The required reverse movement during these latter tool movements is most simply provided by suitable reverse gears or the like for each of the actuators, the forward or reverse connection of such gears being selected by an appropriate tape command.

Returning to the slow approach modification of FIG. 5, the specific circuitry is identical with that described above except for the addition of the approach input and output switches and their control, shown in FIG. 1, and the added gate 126, switch 140, and scaler 130 with its reset 136. Of these added elements, feed rate scaler 130 and its reset 136 are identical with feed length scaler 30 and its reset 36 but include fewer scaler sections, whereas the approach rate switch 140 and gate 126 are new elements preferably utilizing the circuits shown in FIGS. 9 and 10 respectively. It should also be noted that the connections of the modified system of FIG. 5 are somewhat changed from that of FIG. 1, since the feed length switch 70 is connected only to the approach distance switch 140 and gate 126, the total feed length pulse for the operation of control circuit 80 and applied to its terminal 801 being derived from the approach output switches 120 through approach distance gate 126, with such pulse also being utilized to operate scaler resets 36 and 136. Output pulses from the control circuit terminal 43 may be utilized to reset gate 126 and switch 140.

Referring first to FIG. 6, the windings 313 on the scaler cores 320 are each provided with two switches forming a series of approach input switches 122–$I_1$, 122–$I_2$ . . . 122–$I_N$ and a series of approach output switches 120–$O_1$, 120–$O_2$ . . . 120–$O_N$. The input switches are of a momentary contact type and both switches are normally open. Each pair of switches has a common actuating coil 125, such coils being individually operated by suitable tape commands from information input device 90 so that upon energization of one of said coils, an input switch 122 momentarily closes to produce a change in the corresponding core, say to change it from a "0" state to a "1" state, and the corresponding output switch 120 is subsequently closed to connect its winding 313 to approach distance gate 126. The effect of so changing the state of one of the cores is the same as would be the case had the scaler 30 counted down to that particular scaler section, so that the advance of the inserted pulse to the end of the scaler 30 can be used to measure the distance at which it is desired to begin the slow approach, and the advance of scaler input pulse through the scaler to the corresponding approach output winding can thereafter be used to measure the slow approach distance itself, so that the total distance is arrived at in two steps.

The electronic switch circuit for switching from normal to slow approach is shown in FIG. 9. It consists of an input flip-flop comprising two triodes 910a and 910b. One of said triodes 910a has its grid connected at terminal 912 to the output of feed length switches 70 to turn on its associated gate for slow approach, and the other triode 910b has its grid connected at terminal 914 to approach distance gate 126 through control circuits 80 to turn on its associated gate for normal feed from generator 16 or 18, the gate conditions thus being mutually exclusive. The gates themselves are identical with the feed length gate 32 shown in FIG. 1, each consisting of a core 920a, 920b having an input triode 922a, 922b and an operating triode 924a, 924b, together with suitable windings, providing output pulses at terminal 930 from either its input terminal 926b from the generators 16 or 18 directly from gate 32, or its input terminal 926a from feed rate scaler 130.

The approach distance gate 126 specifically shown in FIG. 10 includes a flip-flop circuit having triodes 940a and 940b connected to turn on tetrode 950 upon the application of a pulse at terminal 942 to the grid of triode 940a, such pulse being derived from cut length switches 70. The tetrode 950 has pulses from the approach output switches 120 applied to its grid at terminal 952, and, when conducting, produces corresponding output pulses at terminal 954 for feeding to the feed length gate 32, to the scaler resets, and to control circuit 80 for operating its own triodes 940a, 940b to turn itself off.

The operation of the slow approach circuitry, although already discussed in general, may be summarized as follows, assuming familiarity with the operation of the system as shown in FIG. 1. Turning to FIG. 5, the information input device 90, in addition to its other functions, initially provides a signal to the approach switch control 124 to energize one of its coils. This changes the state of one of the cores of scaler 30. The scaler 30 then operates as before to produce output pulses for eventual feeding to the feed actuators 23, 25 and 27, with the approach rate switch 140 set to obtain its input pulses directly from gate 32 and with the approach distance gate 126 turned off to prevent unwanted pulses from the connected approach output switch 120 from turning off the feed length gate 32. When the initial pulse from the operated approach input switch 122 passes to the last operative stage of scaler 30, the appropriate feed length switch 70 is operated. This actuates the approach rate switch 140 to switch to the slow pulse rate output from feed rate scaler 130 and turns on the approach distance gate 126. Pulses thus continue to be fed into feed rate scaler 30, but at a slower rate, until the operated approach output switch 120 receives its first pulse following the opening of the gate 126. This pulse passes through the gate 126 to turn off feed length gate 32 and reset scalers 36 and 136, approach distance gate 126 and approach rate switch 140, the latter two being operated through control circuits 80 as above explained.

*Summary*

Thus, it will be apparent to those skilled in the art that the invention and apparatus is capable of wide use and susceptible of numerous modifications not herein specifically disclosed. For example, although the circuitry herein disclosed is preferred because of its simplicity and reliability, other circuitry may as well be utilized in the overall system, such elements as scalers, shift registers, storage, gates, switches, etc. having many forms other than those specifically described and shown herein. Accordingly, the invention is not to be construed as limited specifically as shown herein, but only as defined in the appended claims.

We claim:

1. In a control system, a sequential series of pulse scaling elements having a common input and an output associated with each of said scaling elements to provide a plurality of pulse trains of successively decreasing frequency at each said output in inverse proportion to the number of pulse scaling elements interposed between said input and an output, at least two series of output pulse train switch means each having a common output, with each switch means of said series having its input connected to one only of said scaling element outputs, and means for selectively operating each of said series of output pulse train switch means to maintain each of said switch means thereof in a preselected condition providing substantially simultaneously and independently from each of the outputs of said series of switch means a series of pulses decreased in frequency relatively to the input pulses fed to said series of pulse scaling elements by a ratio established by the condition of said switch means of each of said series thereof.

2. In a control system a sequential series of pulse scaling elements having a common input and an output associated with each of said scaling elements to provide a plurality of pulse trains of successively decreasing frequency at each said output in inverse proportion to the number of pulse scaling elements interposed between said input and an output, input switch means for controlling the number of pulses fed to said series of pulse scaling elements to establish a predetermined number of input pulses, at least two series of output pulse train switch means each having a common output, with each switch means of said series having its input connected to one only of said scaling elements, and control means for selectively operating each of said series of output pulse train switch means to maintain each of said switch means thereof in a preselected condition, providing substantially simultaneously and independently from each of the outputs of said series of switch means a series of pulses decreased in number relatively to the predetermined number of input pulses to said series of pulse scaling elements by a ratio established by the condition of said switch means of each of said series thereof.

3. In a control system as claimed in claim 2 wherein said input switch means is connected to an output of said series of output pulse train pulse scaling elements for actuation of said input switch means to establish said predetermined number of pulses.

4. In a control system as claimed in claim 2 further having pulse rate input means for providing input pulses at at least two different frequencies to said series of pulse scaling elements, and frequency selecting switch means for changing the input rate of said pulses.

5. In a control system as claimed in claim 4 wherein said frequency selecting switch means is connected to an output of said series of pulse scaling elements for actuation of said frequency selecting switch means to change the input frequency of said input pulses.

6. In a control system a sequential series of pulse scaling elements having a common input and an output associated with each of said scaling elements to provide a plurality of pulse trains of successively decreasing frequency at each said output in inverse proportion to the number of pulse scaling elements interposed between said input and an output, pulse generator means for supplying pulses to said pulse scaling elements, input switch means connected to an output of said series of scaling elements for controlling the number of pulses fed to said series of pulse scaling elements to establish a predetermined number of input pulses, at least two series of output pulse train switch means each having a common output, with each switch means of said series connected to one only of said scaling elements, and control means for selectively operating each of said series of switch means to maintain each of said switch means thereof in a preselected condition, adder means for each of said series of switch means for adding pulse trains selected by said switch means of said series, providing substantially simultaneously and independently from each of the outputs of said series of switch means a series of pulses decreased in number relatively to the predetermined number of input pulses to said series of pulse scaling elements by a ratio established by the condition of said switch means of each of said series thereof.

7. In a control system as claimed in claim 6 wherein said control means for selectively operating each of said series of switch means includes shift register means, and information input means for said shift register means.

8. In a control system as claimed in claim 6 further including a series of input pulse controlling switch means for selectively connecting one output of said series of pulse scaling elements to said input switch means.

9. In a control system as claimed in claim 6 further including input pulse frequency dividing means and frequency selecting switch means connected between said input switch means and said sequential series of pulse scaling elements, a first series of input pulse controlling switch means for selectively connecting to said frequency selecting switch means a first output of said series of pulse scaling elements at a first selected scaling element thereof, a second series of input pulse controlling switch means for selectively connecting to said input switch means a second output of said series of pulse scaling elements at another selected scaling element in advance of said first scaling element, and a third series of input pulse controlling switch means for selectively providing a pulse input to said other selected scaling element of said series thereof.

10. In a control system as claimed in claim 9, further including gate means interposed between said second series of switch means and said input switch means operable by said first series of switch means to open said gate for transmission of a pulse from said second series of switch means to close said input switch means.

11. In a control system as claimed in claim 10, further including information input means for selecting an input pulse controlling switch means of said second and third series.

12. In a control system a binary scaler comprising a sequential series of binary scaling elements with a common input and an output associated with each of said elements to provide a plurality of pulse trains of successively half value frequencies, pulse generator means for supplying pulses to the input of said scaler, input switch means for controlling the number of pulses fed to the input of said scaler to provide a predetermined number thereof, at least two series of output pulse train switch means, with a switch means of each series connected to one of said binary scaling elements, control means for selectively operating each of said series of output pulse train switch means to maintain each of said switch means thereof in a preselected condition, said control means including storage means for each said switch means, shift register means having a section for each said storage means but operable independently thereof, and information input means for advancing information into said shift register means and thereafter transferring said information to said storage means to set said switch means, adder means for each said series of output pulse train switch means for adding pulse trains selected by said switch means providing substantially simultaneously from each of said series of output pulse train switch means a series of pulses decreased from the predetermined number of input pulses by a ratio established by the condition of said switch means of each of said series thereof, a series of input pulse controlling switch means for selectively connecting the last operative scaling element of said scaler as established by the predetermined number of input pulses to said input switch means to turn off said input pulses upon the arrival of the first pulse at said last operative scaling element, and control means for selectively operating one only of said input pulse controlling switch means.

13. In a control system as claimed in claim 12 wherein said control means for said input pulse controlling switch means includes storage means, shift register means and information input means common with one of said series of output pulse train switch means, said storage means and shift register means having sections beyond said last operative scaling element for receiving input pulse switch controlling information to control said input pulse controlling switch connected to said last operative section.

14. In a control system as claimed in claim 12 wherein said pulse generator means is driven by shaft means, and said series of output pulse train switch means are each arranged to operate feed means to provide feed rates established by the rate of said shaft means.

15. In a control system as claimed in claim 14 wherein three series of output pulse train switch means are provided for operating three feed means.

16. In a control system as claimed in claim 14, further including high speed traverse pulse generator means, and pulse generator switch means for selectively connecting one of said pulse generator means to said input switch means.

17. In a control system a binary scaler comprising a sequential series of binary scaling elements with a common input and an output associated with each of said elements to provide a plurality of pulse trains to successively half value frequencies, pulse generator means for supplying pulses to the input of said scaler, input switch means for controlling the number of pulses fed to the input of said scaler to provide a predetermined number thereof, at least two series of output pulse train switch means, with a switch means of each series connected to one of said binary scaling elements, control means for selectively operating each of said series of output pulse train switch means to maintain each said switch means in a preselected condition, adder means for each said series of output pulse train switch means for adding pulse trains selected by said switch means providing substantially simultaneously from each of said series of switch means a series of pulses decreased from the predetermined number of input pulses by a ratio established by the condition of said switch means of each of said series thereof, input pulse frequency dividing means connected between said input switch means and said scaler, frequency selecting switch means connected between said input switch means, said frequency dividing means and said scaler to provide a decreased input pulse rate, a first series of input pulse controlling switch means for selectively connecting the last operative scaling element of said scaler as established by the predetermined number of input pulses to said scaler to said frequency selecting switch means, a second series of input pulse controlling switch means for selectively connecting to said input switch means a scaling element of said scaler in advance of said last operative scaling element, a third series of input pulse controlling switch means for selectively providing a pulse input to said selected scaling element in advance of said last operated scaling element, information input means for supplying said pulse input to said selected scaling element, and gate means interposed between said second series of input pulse controlling switch means and said input switch means operable by said first series of input pulse controlling switch means to open said gate for transmission of a pulse from said second series of input pulse controlling switch means to turn off said input switch means to establish said predetermined number of input pulses, said input pulse to said selected scaling element advancing to said last operative scaling element to operate said frequency selecting switch and open said gate means during advance of the first of said predetermined number of input pulses through said scaler, said first pulse thereafter advancing to the selected one of said second series of input pulse controlling switch means to operate the input switch means to turn off said input pulses and establish the predetermined number thereof fed to said scaler.

18. In a control system as claimed in claim 17 wherein said pulse generator means is a shaft speed generator and said adder means for said pulse trains are connected to each of two feed actuators to provide simultaneous feeds at a predetermined ratio therebetween.

19. In a control system including shaft means and feed means having an actuator, pulse generator means operated by rotation of said shaft means for supplying pulses in timed relationship to the rotation of said shaft means, said feed actuator being operated by said pulse generator means at a speed synchronized with that of said shaft means.

20. In a control system as claimed in claim 19, wherein said pulse generator means includes a shaft speed generator and means operated by said shaft speed generator for supplying a pulse train for operating said feed actuator at a speed synchronized with that of said shaft means.

21. In a control system as claimed in claim 19, further including control means independent of said shaft speed generator for establishing a predetermined speed relationship between said shaft means and said feed means while maintaining synchronism therebetween.

22. In a control system including shaft means and a feed means having an actuator, shaft speed generator means directly operable by rotation of said shaft means, a sequential series of binary scaling elements with a common input from said shaft speed generator means and output means associated with each of said elements, and control means for said output means for selective operation thereof for establishing a predetermined speed relationship between said shaft means and said feed means while maintaining synchronization therebetween.

23. In a control system, comprising a sequential series of pulse scaling elements having a common input and an output associated with each of said scaling elements to provide a plurality of pulse trains of successively decreasing frequency at each said output in inverse proportion to the number of pulse scaling elements interposed between said input and an output, pulse generator means including shaft speed generator means directly operable by rotation of shaft means for supplying pulses to said pulse scaling elements in synchronism with rotation of said shaft means, input switch means connected to an output of said series of scaling elements for controlling the number of pulses fed to said series of pulse scaling elements to establish a predetermined number of input pulses, at least two series of output pulse train switch means each having a common output connected to actuator means, with each switch means of said series connected to one only of said scaling elements, and control means for selectively operating each of said series of switch means to maintain each of said switch means thereof in a preselected condition, adder means for each of said series of switch means for adding pulse trains selected by said switch means of said series, providing said actuator means substantially simultaneously and independently from each of the outputs of said series of switch means and in synchronism with the rotation of said shaft means with a series of pulses decreased in number relatively to the predetermined number of input pulses to said series of pulse scaling elements by a ratio established by the condition of said switch means of each of said series thereof.

24. In a control system, shaft speed generator means directly operable by rotation of shaft means, a sequential series of pulse scaling elements having a common input from said shaft speed generator means and an output associated with each of said scaling elements to provide a plurality of pulse trains of successively decreasing frequency at each said output in inverse proportion to the number of pulse scaling elements interposed between said input and an output, at least two series of output pulse train switch means each having a common output connected to actuator means, with each switch means of said series having its input connected to one only of said scaling element outputs, and means for selectively operating each of said series of output pulse train switch means to maintain each of said switch means thereof in a preselected condition providing said actuator means substantially simultaneously and independently from each of the outputs of said series of switch means with a series of pulses decreased in frequency relatively to the input pulses fed to said series of pulse scaling elements by a ratio established by the condition of said switch means of each of said series thereof.

25. In a control system including rotatable shaft means and feed means having an actuator for effecting relative feed movement between said shaft means and said feed means responsive to an electrical input signal, electrical circuit means providing said input signal, including means selectively actuable to vary said input sgnial and pulse generator means responsive to rotation of said shaft means for supplying pulses in timed relation to the rotation of said shaft means to vary said input signal, whereby said input signal has a selectively variable component and a component dependent on rotation of said shaft means.

26. In a control system as claimed in claim 25, wherein said means responsive to rotation of said shaft means includes a shaft speed generator directly driven by said rotatable shaft means providing a pulse train output synchronized with the rotation of said shaft means.

27. In a control system as claimed in claim 26, wherein said means selectively actuable to vary said input signal includes means for selecting a portion only of said pulse train output and utilizing said portion as said input signal.

28. In a control system as claimed in claim 27, wherein at least two feed means are provided, and said means selectively actuable to vary said input signal includes at least two means for selecting portions only of said pulse train output and utilizing said portions as independent input signals to each of said feed means.

29. In a control system including rotatable shaft means and feed means having an actuator for effecting relative feed movement between said shaft means and said feed means responsive to an electrical input signal, including means selectively actuable to vary said input signal and pulse generator means for supplying pulses in timed relation to the rotation of said shaft means in dependent of said selectively actuable means to vary said input signal, whereby said input signal has a selectively variable component and a component independent thereof.

30. In a control system as claimed in claim 29, wherein said means independent of said selectively actuable means includes pulse generator means providing a pulse train output.

31. In a control system as claimed in claim 30, wherein said means selectively actuable to vary said input signal includes means for selecting a portion only of said pulse train output and utilizing said portion as said input signal.

32. In a control system as claimed in claim 31, wherein at least two feed means are provided, and said means selectively actuable to vary said input signal includes at least two means for selecting portions only of said pulse train output and utilizing said portions as independent input signals to each of said feed means.

References Cited in the file of this patent

UNITED STATES PATENTS

| | | |
|---|---|---|
| 2,537,427 | Seid | Jan. 9, 1951 |
| 2,711,499 | Lippel | June 21, 1955 |
| 2,736,852 | Nelson | Feb. 28, 1956 |
| 2,741,732 | Cunningham | Apr. 10, 1956 |
| 2,784,359 | Kamm | Mar. 5, 1957 |
| 2,809,333 | Wagner | Oct. 8, 1957 |
| 2,833,941 | Rosenberg | May 6, 1958 |
| 2,843,811 | Tripp | July 15, 1958 |
| 2,870,429 | Hailes | Jan. 20, 1959 |
| 2,922,940 | Mergler | Jan. 26, 1960 |

OTHER REFERENCES

Publications: Electronics, February 1956, pp. 122–130.

Notice of Adverse Decision in Interference

In Interference No. 93,827 involving Patent No. 3,015,806, A. Wang and G. Y. Chu, Machine tool control system, final judgment adverse to the patentees was rendered Sept. 10, 1964, as to claims 1, 2, 3, 4 and 6.

[*Official Gazette October 27, 1964.*]

Disclaimer

3,015,806.—*An Wang*, and *Ge Yao Chu*, Lincoln, Mass. MACHINE TOOL CONTROL SYSTEM. Patent dated Jan. 2, 1962. Disclaimer filed Dec. 27, 1965, by the assignee, *Wang Laboratories, Inc.*

Hereby enters this disclaimer to claim 22 of said patent.
[*Official Gazette May 10, 1966.*]